(No Model.) 2 Sheets—Sheet 1.
E. THOMSON.
PROCESS OF ELECTRIC SOLDERING, BRAZING, AND WELDING.
No. 403,707. Patented May 21, 1889.
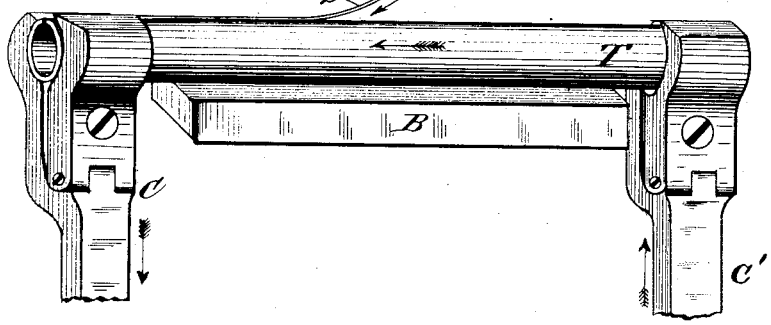
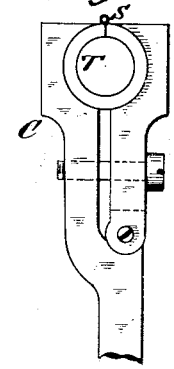
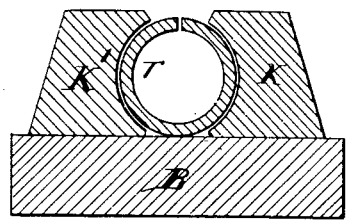
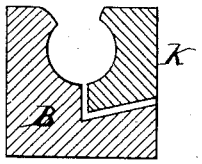
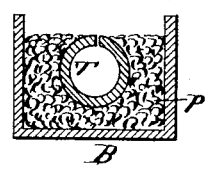
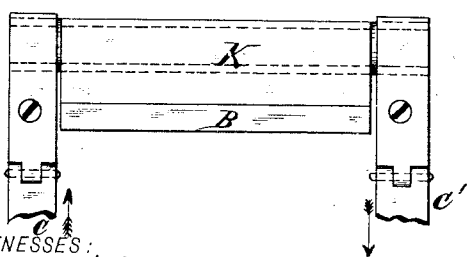
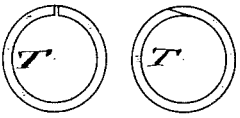
WITNESSES:
INVENTOR
Elihu Thomson
BY
Townsend MacArthur
ATTORNEYS (No Model.) 2 Sheets—Sheet 2.
E. THOMSON.
PROCESS OF ELECTRIC SOLDERING, BRAZING, AND WELDING.
No. 403,707. Patented May 21, 1889.
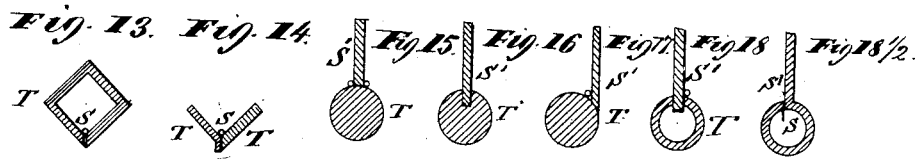
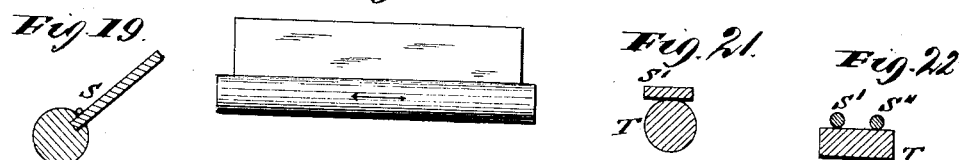
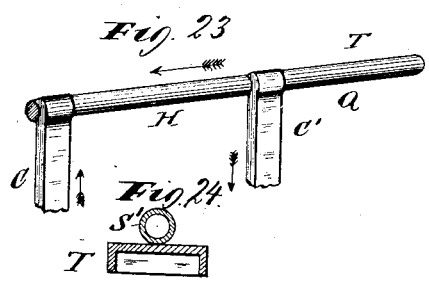
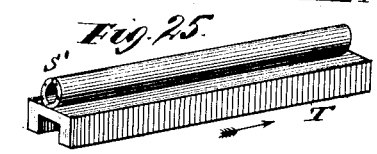
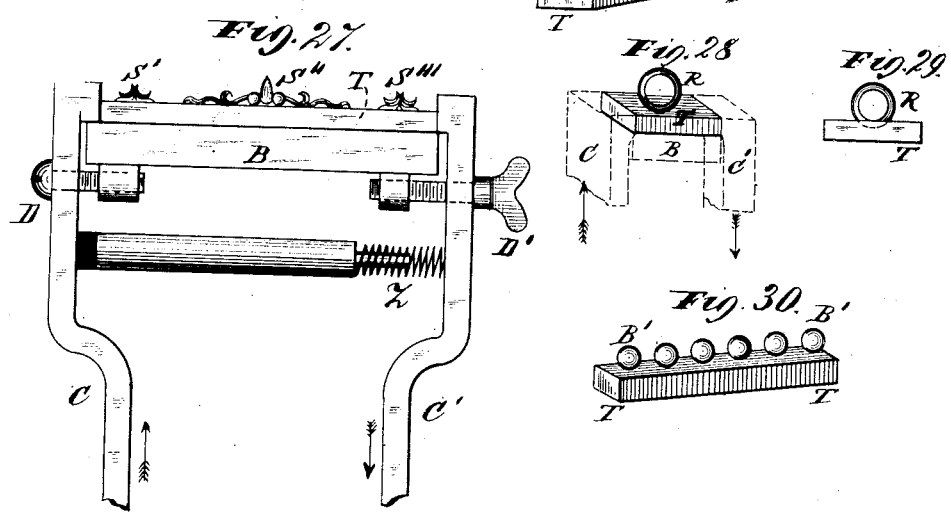
WITNESSES:
Gabriel J. W. Galster
Wm A. Capel
INVENTOR
Elihu Thomson
BY
Townsend & MacArthur
ATTORNEYS

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

PROCESS OF ELECTRIC SOLDERING, BRAZING, AND WELDING.

SPECIFICATION forming part of Letters Patent No. 403,707, dated May 21, 1889.

Application filed August 22, 1887. Serial No. 247,509. (No model.)

*To all whom it may concern:*

Be it known that I, ELIHU THOMSON, a citizen of the United States, and a resident of Lynn, in the county of Essex and State of Massachusetts, have invented a certain new and useful Improvement in Electric Soldering, Brazing, and Welding, of which the following is a specification.

My present invention consists of an improved method of and apparatus for soldering, brazing, or welding metals by the agency of an electric current applied in the manner hereinafter described, so as to heat the metals to be joined by its passage through one or both of them.

The invention is particularly applicable to soldering or brazing the longitudinal seam of small tubes of copper, brass, or other like metals. It is also applicable to the joining of strips to bars or tubes, (by lateral seams or junctures,) as in the irregular ornamentation of the sides of strips or tubes as practiced in the manufacture of jewelry and in other small metal work.

The great advantage of my method of welding, brazing, &c., by electricity is the facility with which the exact soldering temperature may be reached or maintained by putting through the pieces more or less electric current, regulated by means similar to those described in my prior patents on electric welding of metals. There is less liability of injury or overheating, which may occur in the ordinary furnace or gas heating operations. In the electric method the heat may also be distributed more uniformly, being generated in the body of the metal pieces operated upon and not communicated from the outside. The liability to damage small projecting portions by overheating or burning by flame contact is also overcome, and the operator meanwhile secures the greatest comfort in his work, not being required to work over a furnace or a blow-pipe. Besides, in joining delicate pieces by the blow-pipe the blast may easily displace them if resting on another piece, and this may even occur to the flux or small pieces of solder used, and they are apt to be carried off in the blast.

My present invention relates to the manner of applying the electric current to bring the parts that are to be united to the requisite welding or brazing temperature; and it consists, essentially, in making either or both of such parts a portion of a continuous electric circuit formed directly through such part from one clamp or connecting-piece to another and then passing through said part or parts a heavy electric current of volume sufficient to gradually bring the part to the desired or requisite welding or brazing temperature. In this process the path of the electric current through either part is independent of the other, and the circuit, instead of being formed across the joint from one piece or part to the other, is formed in the general direction of the plane of the joint to be established.

In practicing my invention suitable holders or supports are provided for the pieces in order to prevent distortion of form, and in some cases I provide envelopes or jackets surrounding the parts to be heated and formed of a material that is a non-conductor of heat, so as to prevent waste of heat in the operation. I also propose to employ for the jacket or envelope a material of suitable character for preventing oxidation of the pieces, as will be hereinafter described.

In the accompanying drawings, Figure 1 illustrates a tube to which my improved process may be applied. Fig. 2 is an end view of the same. Fig. 3 represents in perspective a simple form of apparatus adapted for use in practicing my invention with the part to be operated upon in place. Fig. 4 is an end view of a clamp or connector such as is shown in Fig. 3. Figs. 5, 6, and 7 illustrate in cross-section various forms of support and jacket for the piece to be operated upon. Fig. 8 is a side elevation of an apparatus provided with the jacket such as is shown in Fig. 5. Figs. 9, 10, 11, and 12 illustrate various forms of joint for the longitudinal seam of a pipe to which my invention may be applied. Fig. 13 shows in cross-section a square tube the longitudinal seam or joint of which may be formed by my improved process. Figs. 14, 15, 16, 17, 18, 18½, 19, 21, and 22 show in cross-section various forms of elongated strips or pieces that may be united by my invention. Fig. 20 is a side view of two strips or pieces such as are shown in cross-section in Figs. 15 or 16. Fig. 22 illustrates a method of carrying out my invention when the pieces to be operated upon are of considerable length. Figs. 24, 25, 26, 28, 29, and 30 illustrate other applications of my invention. Fig. 27 is a side view of an apparatus that may be used in the application of my improved process to the kinds of work illustrated in Fig. 26 and other figures.

In Figs. 1 and 2 is shown a tube, T, made in the ordinary way by bending a rectangular sheet till the edges meet, and requiring for completion a longitudinal seam. To form such a seam by my invention, the tube T is electrically connected at its ends to suitable electric connectors or clamps, C C', to which a heavy electric current from any source may be delivered, and such current is allowed to pass through the tube either over its whole cross-section or at a part thereof near the joint in the longitudinal direction of the joint. The clamps C C' are of a good conductor of electricity and of sufficient section to convey a current which will heat T without heating themselves to any great degree. Underneath the tube T is preferably placed a non-conducting slab, B, of fire-brick or other heat-resisting non-conducting substance, which supports the tube T or other object when heated by the current and prevents sagging. Before, after, or during the passage of the current there is applied a flux, as rosin, tallow, or zinc chloride for the case of soft soldering, and borax, carbonate of soda, or other substance for hard soldering or for welding.

The soldering metal or alloy may be laid on in powder or small pieces in the seam, or a small strip fed into the seam when heated or placed in the seam before heating.

S represents a strip being laid on the seam. The current of electricity being allowed to pass until all that portion of the tube T between the clamps C C' is at a brazing or soldering temperature, the joint is easily perfected. In this case the portion held in the clamps is not brazed or soldered; but if the clamps simply press on the ends of the tube, instead of gripping the ends laterally, the whole length may be operated upon at the same time. Clamps so arranged are shown in Fig. 27.

To economize heat it is preferable to employ during the operation a set of blocks in addition to the supporting-block B, which will form an inclosure or envelope around the sides of the tube and keep the heat from easily escaping. The covering or envelope may be variously arranged, all that is needed being a non-conducting mass around the tube T, which may be easily removed, or from which the tube or piece T may itself be easily removed.

In Fig. 5 side blocks, K K', of fire-brick or loose baked clay, or asbestus compressed, are shown as resting on the base-block B. The pieces B K K', forming the jacket, may be made of carbon, and will then tend also to prevent oxidation of the metal when heated.

The application of a proper envelope to prevent change in the material during the operation forms, however, the subject of a separate application for patent filed by me May 17, 1888, Serial No. 274,193.

In Fig. 6 the support B is shown adapted to receive the tube T and support and protect it from loss by radiation, and is assisted by a block, K, which is carried in a recess in the support B, suitably shaped, as shown.

In Fig. 7 the support is shown as consisting of a box containing powdered or granulated charcoal or coal or powdered or granulated fire-brick, ashes, sand, pumice, or the like non-conductor of heat, leaving the seam portion of T exposed for brazing, welding, or soldering. These provisions against loss of heat and deformation of the piece T are best used where the temperature needed is high, as in hard or silver soldering. The relation of the pieces B K, &c., of Figs. 5, 6, and 7 to the clamps is shown in Fig. 8, which will be understood at once.

The kind of seam to be made at the meeting parts of the piece T makes no difference. In Fig. 9 it is simply a plain butt-seam, and in Fig. 10 it is a lap, in Fig. 11 a rabbeted seam, and in Fig. 12 a broad or spread seam. These latter are suitable also for welding, as the projecting or lapping parts, Fig. 12, may be driven together to effect a union, especially if the metal be iron or steel or other easily-welded metal. Hammering or pressure may be used in this case.

Fig. 13 shows a square tube, T, the joint of which is made by placing the solder, S, in the interior of the corner which is downward, and where the metal edges are.

In Fig. 14 the parts to be joined consist of two strips, T T, the seam being formed at S. The current is applied so as to traverse either one or both pieces longitudinally.

In Fig. 15, T indicates in cross-section a bar or rod, and S' a strip to be joined edgewise to the same by passing the electric current through the rod and strip, or either of them, longitudinally.

In Fig. 16 the strip is shown as let into the side of the rod in a groove provided in the latter, for the purpose of giving a firmer joint by the welding or brazing operation.

In Fig. 17 the strip is shown fitted to the side of the rod T.

The rod T may be hollow, as indicated in Fig. 18, and the strip let into a seam or groove in the same, or, as illustrated in Fig. 18½, the two may be bent out of one piece and the seam formed at S, as before.

Fig. 19 illustrates the position in which the pieces, Figs. 15 to 18½, inclusive, are preferably placed during heating and brazing. In this position the solder may be more readily applied and retained in position during the operation.

In Fig. 20 a strip and rod are shown in side elevation after union.

The above figures simply exemplify a type of operation to which my invention is applicable.

Other applications of the invention are as follows:

Thus a flat strip, S', may be joined flatwise to a round rod or tube, T, as in Fig. 21. In this case it is preferable to have the heating-current traverse both pieces longitudinally.

In Fig. 22 two round or other formed pieces, S' S'', are shown in position to be affixed to a bar, T, underneath them, the current passing in T only, if desired.

It is not necessary that the whole of the tube, strip, or other piece be operated on or heated at once; but the current may be passed through only one section of it at a time, and so progressively the work may be done. This is illustrated in Fig. 23, where the piece T is heated between clamps C and C', so that the part H is operated upon and the part Q is cold at the time. The piece T is then caused to change position either by a gradual movement to the left through the clamps C C', fixed in position, or by moving the clamps on the piece, or moving both clamps and piece. In this way very long tubes may be brazed with apparatus of moderate capacity. My apparatus therefore may serve for the production of great lengths of brazed tubing in one piece, which operation is a very difficult one with the ordinary furnace processes.

In lateral affixing of light metal pieces, as ornamental designs, hooks, chains, &c., to other heavier pieces forming a base, as in jewelry, my invention may be very advantageously used. Thus a light tube, S', Figs. 24 and 25, may easily be soldered or welded to the upper face of a strip, T, which latter is made the path for the current; or, as in Fig. 26, light ornamental work, S' S', may be laid upon a strip, T T, which is heated to braze them on, assuming, of course, the proper application in all such cases of the flux, if needed, and the soft or hard solder. This manner of work is illustrated in Fig. 27, the current-carrying clamps or connectors C C' being caused to press elastically upon or in any other manner making connection with the ends of the piece T T, resting on a non-conducting slab of porcelain, fire-clay, or the like substance, B. A compression-spring, Z, between clamps C C', but insulated from them, may be used to effect this elastic pressure and insure contact, so that current may pass from clamp to clamp through the piece T T. The current brings the piece T T up to the soldering temperature, and light objects—such as ornamental designs—may then be affixed by hard soldering to its upper surface, as indicated at S' S'' S'''. In like manner rings, eyes, or hooks R, Fig. 28, may be brazed to the piece T, as representing bodies of buttons, pieces of jewelry, &c. The ring R, which may be replaced by other projecting pieces, may have a cavity made for its reception in the piece T, Fig. 29, whereby it may be very firmly secured by my electric brazing operation. A series of balls, B' B', may thus be affixed to piece T T, Fig. 30.

One advantage of my invention as applied to such cases of brazing is that the joint obtained is apt to be very complete, on account of the fact that the heavier piece is made the hotter by the current and that the heat is higher internally to the joint than on its surface, whereas in ordinary processes by flame or furnace the application of heat to the surface of the pieces may give apparent unions, which really are only limited to the external surfaces most heated during the operation.

I do not claim in this application the improved art of brazing or soldering by passing a continuous electric current through the parts to be united, as this forms the subject of another application for patent filed by me August 22, 1887, Serial No. 247,507.

What I claim as my invention is—

1. The herein-described method of electric welding, brazing, or soldering, consisting in passing through one or both of the parts or pieces to be operated upon a heavy electric current in the general direction of the line or plane of the joint and of a volume sufficient to bring the piece or pieces to the requisite temperature.

2. The herein-described improvement in electric welding and brazing, which consists in making either or both of the parts or pieces to be joined a portion of a continuous electric circuit formed through each or either independently of the other and carrying a heavy electric current of a volume sufficient, as described, to effect the desired welding or brazing operation.

3. The herein-described process of forming longitudinal seams or joints in or between elongated metal pieces, consisting in passing a heavy electric current through the piece or pieces longitudinally and of a volume sufficient to heat the same to the desired welding or brazing temperature, as and for the purpose described.

4. The herein-described improvement in affixing light metal pieces to a heavier or base piece, consisting in passing an electric current through the latter of a volume sufficient to heat the same to the requisite welding, soldering, or brazing temperature.

5. The herein-described improvement in forming elongated longitudinal seams or joints, which consists in heating portions of the material in successive lengths by the agency of an electric current passing longitudinally and producing the seam or joint of each section while such section is included in the electric circuit, as and for the purpose described.

6. The herein-described improvement in electric welding, brazing, forging, or soldering, which consists in surrounding the parts acted upon by the electric current by a supporting and heat-retaining jacket or envelope, as and for the purpose described.

7. The combination, with the clamps or connectors, of the intermediate bed-plate, arranged as described, to support the body through which the heating electric current passes, as and for the purpose described.

Signed at Lynn, in the county of Essex and State of Massachusetts, this 18th day of August, A. D. 1887.

ELIHU THOMSON.

Witnesses:
GEORGE STUART,
OTIS K. STUART.